United States Patent [19]
Matteson et al.

[11] Patent Number: 5,541,969
[45] Date of Patent: Jul. 30, 1996

[54] MIDLOOP WATER LEVEL MONITOR

[75] Inventors: Donn M. Matteson; Daniel A. Peck, both of South Windsor, Conn.

[73] Assignee: Combustion Engineering, Inc., Windsor, Conn.

[21] Appl. No.: 295,201

[22] Filed: Aug. 24, 1994

[51] Int. Cl.⁶ .................................................. G21C 17/022
[52] U.S. Cl. ................... 376/258; 73/295; 374/54
[58] Field of Search ............................... 376/258; 73/295; 374/54

[56] References Cited

U.S. PATENT DOCUMENTS

| | | | |
|---|---|---|---|
| 3,512,412 | 5/1970 | Weining | 73/295 |
| 3,873,817 | 3/1975 | Liang | 235/151.21 |
| 4,275,447 | 6/1981 | Ruiz | 364/494 |
| 4,292,129 | 9/1981 | Barry | 176/24 |
| 4,302,288 | 11/1981 | Youngborg | 376/210 |
| 4,832,900 | 5/1989 | Harbaugh et al. | 376/259 |
| 5,103,674 | 4/1992 | Outwater | 73/319 |
| 5,211,904 | 5/1993 | Oosterkamp | 376/258 |

FOREIGN PATENT DOCUMENTS

| | | | |
|---|---|---|---|
| 289333 | 4/1991 | Germany | 73/295 |
| 2168153 | 6/1986 | United Kingdom | 73/295 |
| 2278448 | 11/1994 | United Kingdom | 73/295 |

*Primary Examiner*—Charles T. Jordan
*Assistant Examiner*—Chrisman D. Carroll
*Attorney, Agent, or Firm*—L. James Ristas; John H. Mulholland

[57] ABSTRACT

A tank (18) forms a chamber having an upper and lower region. The tank (18) is in even elevation with a horizontal pipe (12) having a top region and a bottom region. An upper connecting pipe (14) fluidly connects the top region of the pipe (12) to the upper region of tank (18). A lower connecting pipe (16) fluidly connects the bottom region of pipe (12) to the lower region of the tank (18). Heat junction thermocouples (22) generate a signal indicative of water in the pipe (12). The signal is transmitted to a remote location by line (24).

12 Claims, 3 Drawing Sheets

1

MIDLOOP WATER LEVEL MONITOR

BACKGROUND OF THE INVENTION

The present invention is directed to a water level indicator for use in a nuclear power plant.

During maintenance periods at a nuclear power plant, it is important for safety reasons to know the level of water in the hot leg of the water line travelling from the reactor vessel to the heat exchanger to ensure proper reactor core cooling. Present methods of measuring the water in this particular pipe have proven inadequate because of inaccuracies in the measurement of the water level in the pipe or the inability to make the water level reading from the control room of the power plant.

During nuclear plant operation, water is heated under pressure in the reactor vessel. The water then travels through the hot leg pipe of the water circulation system to the heat exchanger/steam generator where the water is cooled. The cooled water then travels through a circulation pump to be returned to the reactor vessel for reheating. The water serves as the medium to cool the reactor core and transfer heat to the heat exchanger steam generator.

During maintenance periods, water needs to be drained from the heat exchanger/steam generators to facilitate examination of the generator's internal equipment. While the steam generator does not serve its heat exchanging function during these maintenance periods, the water is cooled by another heat exchanger as the water continues to function as a coolant for the core. Since the hot leg pipe lies in essentially a horizontal plane, the precise level of water in the pipe is important. Should the water in the pipe be too high, or full, the inside of the generator, where work crews are performing examinations, could be flooded. Should the water level in the hot leg pipe be too low, or empty, this could indicate a water level too low to maintain proper cooling of the nuclear core. Because the hot leg has a direct fluid connection to the reactor vessel, the hot leg is in a convenient position for measuring the water level to ensure proper water level in the core. Therefore, being able to measure the precise water level in the hot leg pipe is of crucial importance for safety. It is of additional safety consideration that the level may be measured from the nuclear plant's control room where other safety equipment is monitored.

SUMMARY OF THE INVENTION

The primary object of the present invention is to provide apparatus to accurately measure the level of water in the hotleg of a pressurized water reactor system.

It is a further object of the invention that the measurement of the level of the water can be monitored from a remote location such as the control room.

It is another objective of the invention that the monitoring can be performed during all periods of plant operation and maintenance.

It is still another objective of the invention that a measurement system can be permanently installed on the hot water leg pipe.

It is yet another object of the invention to have a water level measurement system that can selectively be isolated from the hot leg water pipe.

In fulfillment of these and other objectives, the midloop water level monitor of the present invention comprises a remote chamber fluidly connected to the pipe for measurement of the level of water in the pipe.

In particular, a remote tank forming a chamber is located at an elevation substantially the same as that of the hot water pipe. A lower connecting pipe extends from the bottom of the hot water pipe to the bottom of the chamber and an upper connecting pipe extends from the top of the hot water pipe to the top of the chamber. The result is that the level of water in the chamber is substantially the same as the level of water in the pipe.

Inside the chamber are means such as heated junction thermocouples for measuring the level of water in the chamber. It is also possible to use mechanical measurement systems, such as a float, connected to a rheostat or other electrical means of generating an electrical signal commensurate with the water levels.

Isolation valves are located on each of the connecting pipes to allow isolation of the chamber from the main pipe such as during power generating operation of the power plant. This allows maintenance of the water level monitor without disrupting plant operation. In addition, because the water level monitor need only be at the same elevation as the hot leg pipe, the monitor can be located at any remote distance from the hot leg pipe. The isolation valves allow maintenance at this remote location during plant operation. These isolation valves can also be used to protect the detection equipment in the chamber from the pressure and heat of the water traveling through the pipe when the plant is in full operation.

Since the hot water pipe lies in a substantially horizontal plane, it is important to be able to measure the water in this pipe with accuracy because a change of even a fraction of an inch within this pipe can result in an excessive level of water, which could flood the steam generator chamber during an examination by plant personnel, or an insufficient level of water, which could result in degradation of cooling of the reactor core.

BRIEF DESCRIPTION OF THE DRAWINGS

The invention will be more readily understood with reference to the accompanying drawings wherein.

DETAILED DESCRIPTION OF THE INVENTION

Figure 1:
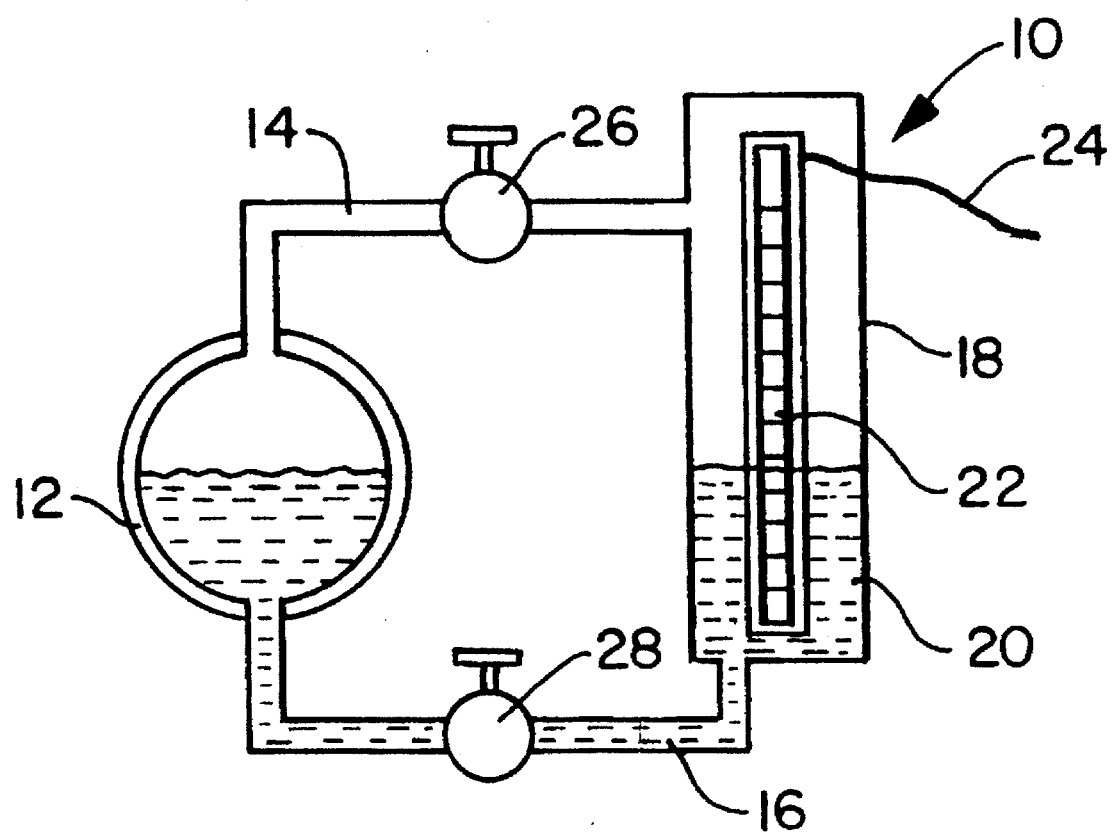
FIG. 1 is a partial cross-sectional view of the midloop water level monitor.

FIG. 1 is a partial cross-sectional view of the midloop water level monitor 10 connected to the main pipe 12 of the hot water leg of a nuclear power plant. Main pipe 12 is the hot water leg. Chamber 18 is placed at substantially the same elevation as the main pipe 12. An upper connecting pipe 14 forms a fluid connection from the top region of pipe 12 to the upper region of tank 18. A lower connecting pipe 16 fluidly connects the bottom region of pipe 12 to the lower region of tank 18. A fluid 20, such as water, is shown partially filling the main pipe 12 and the chamber 18. A fluid level indicator 22 is located in chamber 18. In the preferred embodiment of the invention, the water level indicator 22 is comprised of closely spaced heated junction thermocouples (HJTCs) that indicate by temperature gradient the level of water in the chamber 18 and therefore in the pipe 12. The signal from the HJTCs is transmitted from the chamber to a remote location along line 24. HJTCs are preferred because they are fully qualified for operation at system pressures and temperatures during plant power production.

In the preferred embodiment of the invention, the water level monitor 10 further comprises two isolation valves 26, 28 that can be used to selectively isolate the chamber 18 from the pipe 12. These selective isolation valves 26, 28 allow maintenance to be performed on chamber 18 while the power plant is running and pressurized hot water is running through pipe 12. It should be recognized that a plurality of valves may be used to isolate the chamber 18 from the pipe 12.

It is recognized that chamber 18 may be located at any remote location from the pipe, as long as that location is on substantially the same elevation as the hot water pipe 12. Therefore, the chamber 18 can even be located in a completely separate room from the hot water pipe. The preferable location of the connecting upper pipe 14 and the lower connecting pipe 16 is onto the main pipe 12 at substantially the longitudinal middle of the hot water pipe. This allows the best indication of the water level in the pipe and will allow the monitoring of the water level so that work areas in the steam generator are not flooded during maintenance, and that loss of cooling at the core does not occur.

Figure 2:
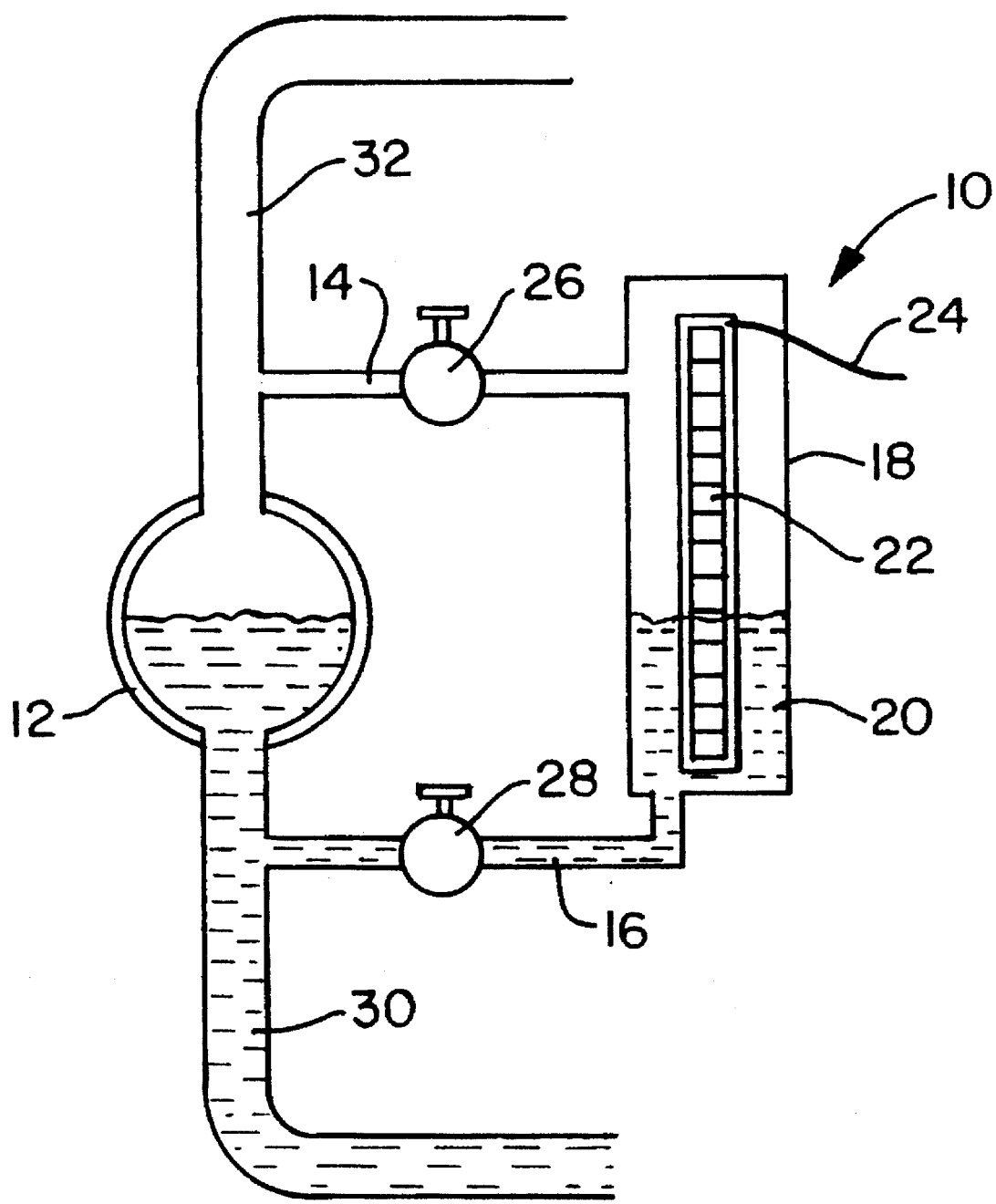
FIG. 2 is the midloop water level monitor of FIG. 1 connected to branch lines of the hot leg.

FIG. 2 is a partial cross section of a variation of the water level monitor of FIG. 1 wherein the water level monitor is not directly connected to the hot water pipe 12, but is instead connected into secondary pipes 30 and 32 that connect to the hot water pipe 12. The lower connecting pipe 16 may be directly connected to any lower secondary pipe coming from the bottom of pipe 12, for example, the shut down cooling line. Similarly, the upper connecting pipe may be connected to any secondary upper pipe 32 that connects to the top of the main pipe 12, for example, the surge line. The secondary and connecting pipes are of sufficient size to ensure equalization of the air pressure between the chamber and the hot leg pipe, and therefore the water levels in the chamber and the hot leg pipe. Again, it is recognized that tank 18 must be at substantially the same elevation as pipe 12. The result is that a fluid 20, such as water, in the hot water main pipe 12 will be at the same fluid level in the pipe and in the chamber. Isolation valves 26 and 28 may isolate the chamber from the rest of the hot water system comprising the main pipe and any secondary or connecting pipes, such as pipe 32.

Figure 3:
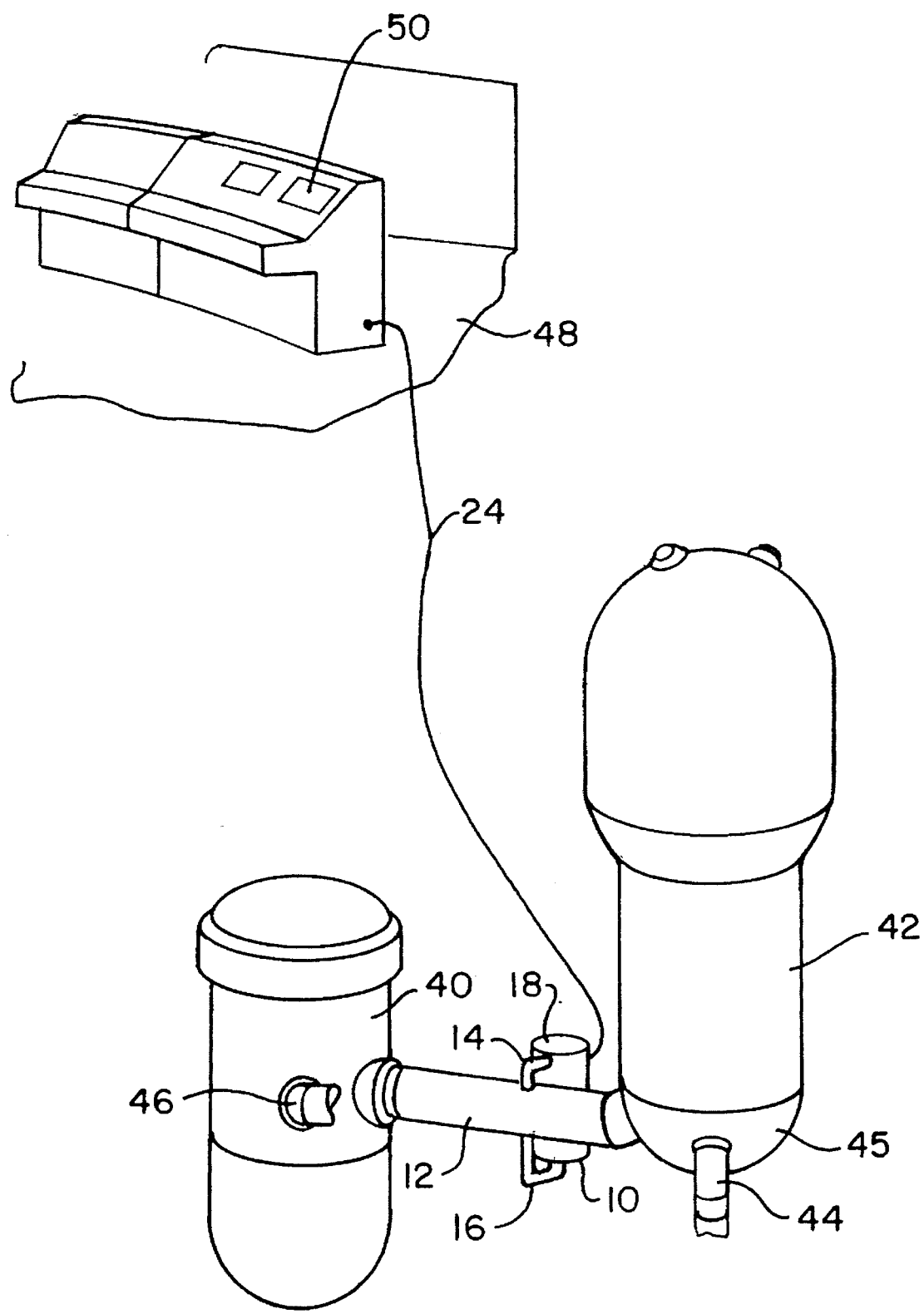
FIG. 3 is an illustrative view of the midloop water level monitor of FIG. 1 in a nuclear power plant.

FIG. 3 is a partial view of a nuclear power plant. The midloop water level monitor 10 comprising the tank 18 and upper and lower connecting pipes 14, 16 is connected substantially midway on the hot water pipe 12. The hot water pipe 12 connects the reactor vessel 40 to steam generator 42. Water is heated in the core within vessel 40, travels through the hot pipe 12 to the steam generator 42 where steam is generated in the secondary water loop (not shown). The water, thus cooled, then leaves the steam generator 42 by line 44, travels through a pump (not shown) and returns to the reactor core 40 by inlet 46. This path of the water comprises a hot water loop.

It is necessary during down times of the plant operation to perform maintenance inside the steam generator 42, particularly in the lower head 45. Because of the orientation of the reactor 40 and the steam generator 42, the hot water pipe 12 is in a substantially horizontal position at an elevation such that the upper region of pipe 12 aligns with a portion of head 45. The result is that even small changes in the level of water in the pipe 12 can result in the flooding of the bottom of the heat exchanger 42 if the level is too high, or insufficient water in the core to perform critical cooling functions if the water level is too low. In addition, if the level of water in the hot leg falls too low, the shut down cooling suction pipe (not shown) will form a vortex of cooling water while drawing the water from the hot leg pipe. This vortex reduces cooling flow of the water. As a result, the core appears to be adequately covered with water, but the reduced flow because of the vortex allows a core overheating condition to occur. Because of this critical cooling function, it is important that operators in the control room 48 be able to monitor the level of water in the pipe even during shut down periods. The signal indicative of the water level from the midloop water level monitor is transmitted along line 24 to control panel 50 where the information is displayed. This allows an operator in the control room 48 to completely monitor all information about the hot water loop system even during a shut down period. The signal can also be transmitted to a computer for integration into a plant safety monitoring and display system.

What is claimed is:

1. In a pressurized water nuclear power plant, a water level monitor responsive to the water level in a reactor vessel that is fluidly connected to a steam generator, comprising:

a main pipe for delivering heated water from said reactor vessel to said steam generator during normal plant operation, said main pipe including a horizontal portion having a top region at a top elevation and a bottom region at a bottom elevation;

a tank forming a chamber, the chamber having an upper region at an upper elevation and a lower region at a lower elevation, wherein said top region of the pipe is at the same elevation as said upper region of the chamber, and said bottom region of the pipe is at the same elevation as said lower region of the chamber;

a secondary upper pipe in fluid connection with the top region of the main pipe;

a secondary lower pipe in fluid connection with the bottom region of the main pipe;

an upper connecting pipe, fluidly connecting the secondary upper pipe to the upper region of the chamber;

a lower connecting pipe, fluidly connecting the secondary lower pipe to the lower region of the chamber, whereby water in the horizontal portion of the main pipe can communicate freely with said chamber;

means in the chamber for generating a signal indicative of a water level in the chamber; and means for transmitting the signal to a remote location.

2. The nuclear power plant of claim 1, wherein the upper connecting and the lower connecting pipes have valves for selectively isolating the chamber from the main pipe.

3. The nuclear power plant of claim 1, wherein the means for generating a signal is a plurality of heated junction thermocouples.

4. The nuclear power plant of claim 1, wherein the chamber is sealed from atmosphere.

5. The nuclear power plant of claim 1, wherein the remote location is a control room in the nuclear power plant.

6. The nuclear power plant of claim 1, wherein the secondary upper pipe is a surge line.

7. The nuclear power plant of claim 1, wherein the secondary lower pipe is a shut down cooling line.

8. The nuclear power plant of claim 7, wherein the secondary upper pipe is a surge line.

9. The nuclear power plant of claim 8, wherein the upper connecting and the lower connecting pipes have valves for isolating the chamber from the main pipe.

10. A nuclear power plant comprising;

a control room;

a nuclear reactor vessel situated remotely from the control room;

a steam generator having a lower head;

a hot leg water pipe having a horizontal run which defines top and bottom elevations, said pipe fluidly connecting the reactor vessel to the steam generator lower head for supplying a flow of hot water from the vessel to the steam generator during normal operation;

a water level monitor chamber having an upper region at the same elevation as the top elevation of the pipe and a lower region at the same elevation as the bottom elevation of the pipe;

means for fluidly connecting the pipe at the top elevation to the upper region of the chamber;

means for fluidly connecting the pipe at the bottom elevation to the lower region of the chamber;

means for generating a signal indicative of a water level in the chamber; and means for transmitting the signal from the chamber to the control room.

11. The power plant of claim 10, wherein the means for generating a signal is a plurality of heated junction thermocouples.

12. The power plant of claim 10, wherein the control room has means for displaying the signal on a computer monitor.

* * * * *